US012751878B2

(12) United States Patent
Hanson et al.

(10) Patent No.: US 12,751,878 B2
(45) Date of Patent: Oct. 6, 2026

(54) BACK WEDGE

(71) Applicant: Texas Tech University System, Lubbock, TX (US)

(72) Inventors: Jeffrey L. Hanson, Lubbock, TX (US); Senja Collins, Lubbock, TX (US)

(73) Assignee: TEXAS TECH UNIVERSITY SYSTEM, Lubbock, TX (US)

( * ) Notice: Subject to any disclaimer, the term of this patent is extended or adjusted under 35 U.S.C. 154(b) by 0 days.

(21) Appl. No.: 18/833,366

(22) PCT Filed: Jan. 27, 2023

(86) PCT No.: PCT/US2023/011772
§ 371 (c)(1),
(2) Date: Jul. 25, 2024

(87) PCT Pub. No.: WO2023/147077
PCT Pub. Date: Aug. 3, 2023

(65) Prior Publication Data
US 2025/0143942 A1 May 8, 2025

Related U.S. Application Data

(60) Provisional application No. 63/304,555, filed on Jan. 28, 2022.

(51) Int. Cl.
*A61G 7/057* (2006.01)

(52) U.S. Cl.
CPC .................................... *A61G 7/057* (2013.01)

(58) Field of Classification Search
CPC .. A61G 7/057; A61G 7/05707; A61G 7/1038; A61G 7/1051; A61G 7/1053; A61G 7/1055; A61G 7/1057; A61G 7/1088; A61G 13/122; A61G 13/1225
See application file for complete search history.

(56) References Cited

U.S. PATENT DOCUMENTS 1,063,423 A * 6/1913 Edelin .................. A47C 20/027 5/633
1,865,030 A * 6/1932 Mccauley .............. A47C 1/146 297/229
2,663,029 A * 12/1953 Whitley ............... A47C 20/043 5/640
2,816,599 A * 12/1957 Adams ...................... A45F 4/02 D6/716.4
(Continued)

FOREIGN PATENT DOCUMENTS

CN 110973877 B * 8/2023 ............. A47C 1/024
WO 2014108439 A1 7/2014

OTHER PUBLICATIONS

PCT/US2023/011772, International Search Report and Written Opinion, Apr. 5, 2023, 10 pgs.

*Primary Examiner* — David E Sosnowski
(74) *Attorney, Agent, or Firm* — LOZA & LOZA, LLP; Kevin L. Soules

(57) ABSTRACT

A burn bed system comprises a frame further comprising a first triangular shaped stand, a second triangular shaped stand, and at least one cross beam connecting the first triangular stand and the second triangular stand, and a mesh support assembly extending between the first triangular stand and the second triangular stand and configured to with straps to provide variable tension.

9 Claims, 8 Drawing Sheets

(56) References Cited

U.S. PATENT DOCUMENTS

| | | | | | |
|---|---|---|---|---|---|
| 2,856,614 | A * | 10/1958 | O'leary | A47C 20/027 297/391 |
| 3,120,008 | A * | 2/1964 | Watson | A47C 20/027 297/391 |
| 4,410,214 | A * | 10/1983 | Geschwender | A47C 3/16 297/118 |
| 5,125,650 | A * | 6/1992 | Paris | A63B 21/00047 482/142 |
| 5,214,816 | A * | 6/1993 | Collins | A47C 16/005 5/639 |
| 5,425,567 | A * | 6/1995 | Albecker, III | A47C 7/46 297/452.29 |
| D368,199 | S * | 3/1996 | Winslow | D6/392 |
| 5,755,492 | A * | 5/1998 | Iver | A47C 16/005 297/352 |
| 6,154,904 | A * | 12/2000 | Ehredt | A47G 9/1009 5/639 |
| D805,591 | S * | 12/2017 | Miller | D21/698 |
| D846,926 | S * | 4/2019 | Hairabedian | D6/718 |
| D868,916 | S * | 12/2019 | Engler | D21/303 |
| D877,256 | S * | 3/2020 | Engler | D21/303 |
| 10,688,335 | B1 * | 6/2020 | Maher | A63B 24/0087 |
| 11,653,772 | B2 * | 5/2023 | Goff | A47D 15/003 5/97 |
| 2009/0260159 | A1 * | 10/2009 | Buchanan | A61G 7/0507 5/617 |
| 2012/0266382 | A1 * | 10/2012 | Goddert | A61G 7/015 5/616 |
| 2016/0286982 | A1 * | 10/2016 | Smith | A47D 9/016 |
| 2021/0379498 | A1 * | 12/2021 | Sampaio | A47C 15/004 |
| 2025/0366619 | A1 * | 12/2025 | Barnes | A47C 4/22 |

* cited by examiner

BACK WEDGE

CROSS REFERENCE TO RELATED APPLICATIONS

This patent application claims the priority and benefit under 35 U.S.C. § 119(e) of U.S. Provisional Patent Application Ser. No. 63/304,555 filed Jan. 28, 2022, entitled “BURN BED.” U.S. Provisional Patent Application Ser. No. 63/304,555 is herein incorporated by reference in its entirety.

TECHNICAL FIELD

Embodiments are generally related to the field of medical devices. Embodiments are further related to medical beds. Embodiments are also related to patient beds. Embodiments are also related to beds specially configured to comfortably accommodate burn patients.

BACKGROUND

Every year, upwards of 50,000 Americans are hospitalized with severe burns. In many cases these patients must receive skin grafts to help the healing process. Skin grafting is a surgical procedure that involves removing skin from one area of the body and moving it, or transplanting it, to a different area of the body. In order to help the skin graft take to the skin, the graft needs to receive proper airflow-many times patients with severe burns will have burns that stretch across their backs. Because of this, the traditional hospital beds are not well suited for burn patients receiving skin, particularly for grafts along their back.

In order to properly aid in the treatment and recovery of a patient while being able to function in a hospital setting, a new solution is required. For example, current medical beds do not allow proper airflow to patients’ backs, are not washable (as necessary for maintaining sanitary conditions, do not all bear variable weight, and are not angled to ease patient treatment.

As such new systems are required for comfortably and safely accommodating burn patients during medical treatment, as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a medical device.

It is another aspect of the disclosed embodiments to provide systems and apparatuses for medical beds.

It is another aspect of the disclosed embodiments to provide methods and systems for comfortably and safely accommodating burn patients.

It will be appreciated that the methods and systems can be achieved according to the embodiments disclosed herein. In certain embodiments, the system comprises a frame comprising a first triangular shaped stand, a second triangular shaped stand, and at least one cross beam connecting the first triangular stand and the second triangular stand, and a mesh support extending between the first triangular stand and the second triangular stand. In an embodiment, the system includes at least one riser configured between two sides of the first triangular shaped stand and at least one riser configured between two sides of the second triangular shaped stand. In an embodiment, the first triangular shaped stand, the second triangular shaped stand, and the at least one cross beam are made of stainless steel tubing. In an embodiment, the frame a lower rear cross beam configured to connect to a right angle of the first triangular shaped stand and a right angle of the second triangular shaped stand; a lower middle cross beam extending between a bottom side of the first triangular shaped stand and a bottom side of the second triangular shaped stand; and a top cross beam configured between a top apex of the first triangular shaped stand and a top apex of the second triangular shaped stand. In an embodiment, the system includes a plurality of straps operably attached to the mesh support and a plurality of mounts on the frame, each of the plurality of mounts configured to operably engage one of the plurality of straps. In an embodiment, the mesh support further comprises a hospital grade, machine washable mesh. In an embodiment, the system weighs 30 pounds or less. In an embodiment, the frame comprises a wedge shape and the mesh support is held at a 30 degree angle or less. In an embodiment, angles in the frame are curved.

In certain embodiments, the system can include stainless double ring adjustable strap tensioning system and unique “twisted dog bone” connectors for rotational flexibility from straps to the frame. In certain embodiments, grommets can be configured on the bottom corners of the mesh as well as male pegs on the frame for the rings which keep the mesh from riding up the wedge. The frame can be selected to be a one piece welded frame to minimize crevices and increase the ease of sanitizing device. Likewise, all metal components can be of stainless steel construction for sterilizing.

In an embodiment, the system further comprises at least one riser configured between two sides of the first triangular shaped stand and at least one riser configured between two sides of the second triangular shaped stand. In an embodiment, the first triangular shaped stand, the second triangular shaped stand, and the at least one cross beam are made of stainless steel tubing. In an embodiment, the frame comprises a lower rear cross beam configured to connect to a right angle of the first triangular shaped stand and a right angle of the second triangular shaped stand, a lower middle cross beam extending between a bottom side of the first triangular shaped stand and a bottom side of the second triangular shaped stand, and a top cross beam configured between a top apex of the first triangular shaped stand and a top apex of the second triangular shaped stand. In an embodiment, the system further comprises a plurality of straps operably attached to the mesh support and a plurality of mounts on the frame, each of the plurality of mounts configured to operably engage one of the plurality of straps. In an embodiment, each of the plurality of mounts are configured to allow a tension of one of the plurality of straps to be adjusted. In an embodiment, the mesh support further comprises a hospital grade, machine washable mesh. In an embodiment, the system weighs 30 pounds or less. In an embodiment, the frame comprises a wedge and the mesh support is held at a 30 degree angle or less. In an embodiment, the angles in the frame are curved.

In an embodiment, a burn bed comprises a frame comprising a first triangular shaped stand configured as a right triangle, a second triangular shaped stand configured as a right triangle and at least one cross beam there between, a mesh support configured to attach to the frame forming a slanted support surface, and a plurality of straps connecting the support to the frame. In an embodiment, the burn bed further comprises at least one riser configured between two sides of the first triangular shaped stand and at least one riser configured between two sides of the second triangular shaped stand. In an embodiment, the bottom angle of the first triangular shaped stand is nominally 30 degrees, and the bottom angle of the second triangular shaped stand is nominally 30 degrees. In an embodiment, the frame comprises a wedge and the mesh support is held at a 30 degree angle or less. In an embodiment, the first triangular shaped stand, the second triangular shaped stand, and the at least one cross beam are made of stainless steel tubing. In an embodiment, the at least one cross beam further comprises a lower rear cross beam configured to connect to a right angle of the first triangular shaped stand and a right angle of the second triangular shaped stand, a lower middle cross beam extending between a bottom side of the first triangular shaped stand and a bottom side of the second triangular shaped stand, and a top cross beam configured between a top apex of the first triangular shaped stand and a top apex of the second triangular shaped stand. In an embodiment, the burn bed further comprises a plurality of mounts on the frame, each of the plurality of mounts configured to operably engage one of the plurality of straps. In an embodiment, each of the plurality of mounts further comprise a barrel screw assembly and a toothed cam buckle assembly. In an embodiment, the system weighs 30 pounds or less.

In an embodiment, a burn bed apparatus comprises a frame comprising a first triangular shaped stand, a second triangular shaped stand, at least one cross beam connecting the first triangular stand and the second triangular stand, at least one riser configured between two sides of the first triangular shaped stand, and at least one riser configured between two sides of the second triangular shaped stand; a mesh support extending between the first triangular stand and the second triangular stand; a plurality of straps connected to the mesh support; and a plurality of mounts on the frame, each of the plurality of mounts configured to operably engage one of the plurality of straps. In an embodiment, each of the plurality of mounts further comprise: a barrel screw assembly and a toothed cam buckle assembly.

BRIEF DESCRIPTION OF THE FIGURES

The accompanying figures, in which like reference numerals refer to identical or functionally similar elements throughout the separate views and which are incorporated in and form a part of the specification, further illustrate the embodiments and, together with the detailed description, serve to explain the embodiments disclosed herein.

DETAILED DESCRIPTION

Figure 1:
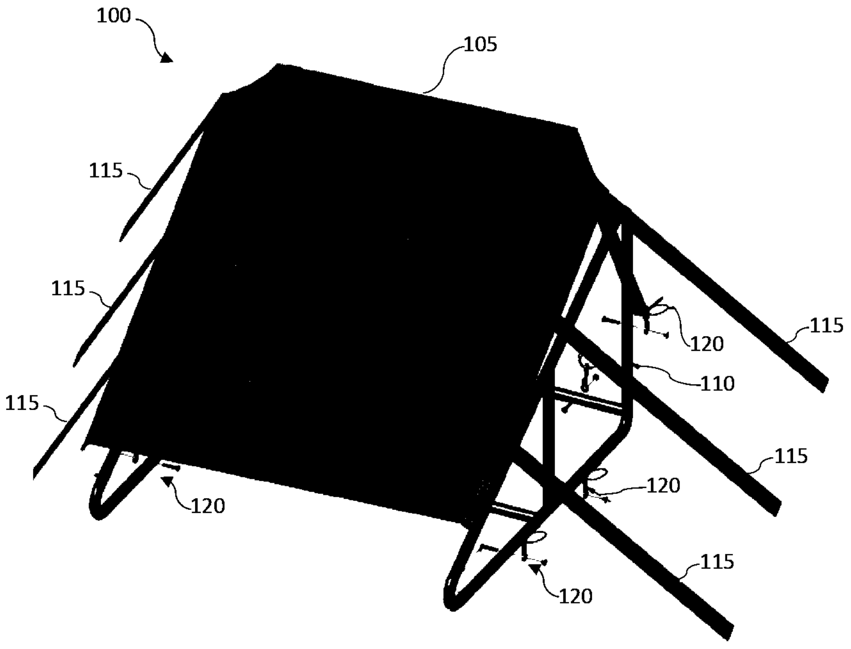
FIG. 1 depicts a perspective view of a burn bed system, in accordance with the disclosed embodiments.

Embodiments and aspects of the disclosed technology are presented herein. The particular embodiments and configurations discussed in the following non-limiting examples can be varied, and are provided to illustrate one or more embodiments, and are not intended to limit the scope thereof.

Reference to the accompanying drawings, in which illustrative embodiments are shown are provided herein. The embodiments disclosed can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms “a”, “an”, and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase “in one embodiment” as used herein does not necessarily refer to the same embodiment and the phrase “in another embodiment” as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope and concept of the invention as defined by the appended claims.

In order to properly aid in the recovery of a patient while being able to function in a hospital setting, the disclosed systems are configured as a support or bed for a patient. The system includes various features and design aspects as further detailed herein.

FIG. 1 illustrates a burn bed system 100. The burn bed system 100 generally comprise a frame 110 and a support 105. The support 105 can be mounted to the frame 110 with straps 115 and mounts 120. The support 105 can be stretched between the frame 110 to create a support or bed for a patient, most commonly a burn patient.

As a rule of thumb burn a patient is in a burn unit for a period of time that equates roughly to the total body surface area (TBSA) which has been affected. For example, if someone sustains a 10% TBSA burn they will, roughly speaking, be in the burn unit for 10 days. Complications to healing can occur for many reasons. However, for an intubated patient the majority of their time must be spent on their back or in a supported hard lateral turn onto their side.

Grafted burns need airflow to prevent damp environments from forming. Damp environments can grow mold and fungus. Damp environments also affect the adherence of new grafted skin. For burns on a patient's back, where the only option is for the patient to rest on their back or side, the burn bed system 100 can support the patient without causing additional pressure points and can allow air flow through the support 105 to their back.

In certain embodiments, the burn bed system 100 can be made to slope at a 30° angle (or less) so that medical personnel can safely keep intubated patients on the bed and minimize the chances of choking.

Figure 2:
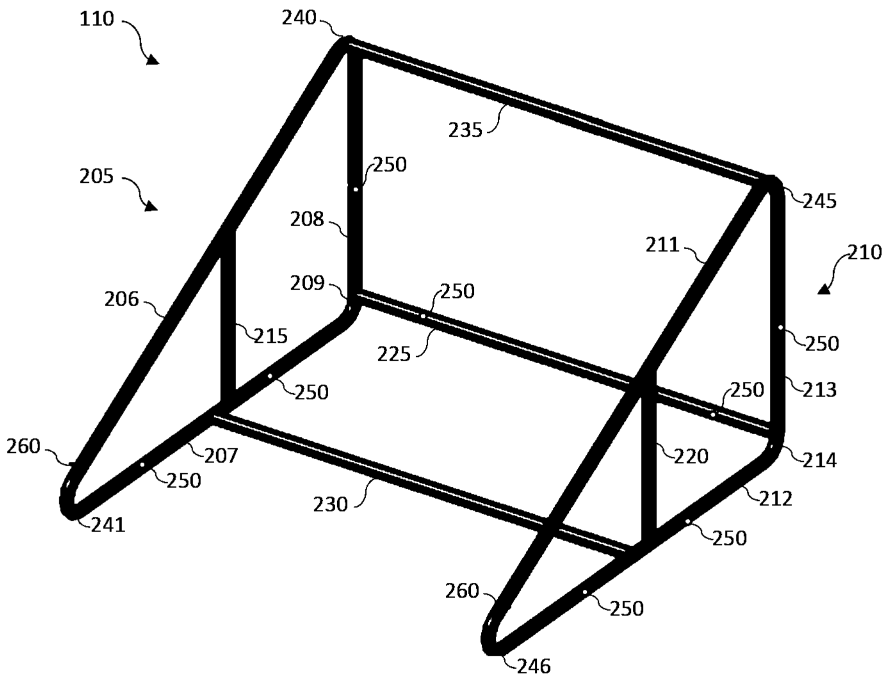
FIG. 2 depicts a frame associated with a burn bed system, in accordance with the disclosed embodiments.

FIG. 2 illustrates aspects of the frame 110 in accordance with the disclosed embodiments. The frame 110 can be made from a non-corrosive material that can withstand frequent cleanings. In certain embodiments, the frame can be made of stainless steel tubing, although in other embodiments, other materials can be used. In addition, the frame itself can be configured to be smooth and be relatively free of sharp bends and/or crevices so that there are not any places for bacteria to grow.

The frame 110 can comprise a first triangular shaped stand 205 and a second triangular shaped stand 210 connected with one or more cross beams between the first triangular stand 205 and the second triangular stand 210. The support 105 is configured to extend between the first triangular stand 205 and the second triangular stand 210. In an embodiment, a first riser 215 is configured between the hypotenuse side 206 and adjacent side 207 of the first triangular shaped stand 205. Likewise, a second riser 220 is configured between the hypotenuse side 211 and adjacent side 212 of the second triangular shaped stand 210.

In certain embodiments, the frame 110 further comprises a lower rear cross beam 225 configured to connect to a right angle 209 between the adjacent side 207 and opposite side 208 of the first triangular shaped stand 205. The lower rear cross beam 225 is further configured to connect to a right angle 214 between the adjacent side 207 and opposite side 213 of the second triangular shaped stand 210. A lower middle cross beam 230 extends between the adjacent side 207 of the first triangular shaped stand 205 and the adjacent side 212 of the second triangular shaped stand 210. A top cross beam 235 is configured between a top apex 240 of the first triangular shaped stand 205 and a top apex 245 of the second triangular shaped stand 210.

It should be appreciated that right angle 209, along with top angle 240 and bottom angle 241 of the first triangular shaped stand 205, can be curved to facilitate sanitation and cleaning. Likewise, the right angle 214, along with top angle 245 and bottom angle 246 of the second triangular shaped stand 210, can be curved to facilitate sanitation and cleaning. In certain embodiments, the burn bed system 100 can be configured to provide the support at a 30° angle (or less). This is accomplished by making bottom angle 241 and bottom angle 246 30° or less.

In accordance with the disclosed embodiments, the frame 110, and associated components, can be made out of 304 stainless steel. This stainless steel is optionally selectable for its structural integrity, weight, and resistance to corrosion. In other embodiments, other steel types and/or aluminum can also be used.

In certain embodiments the frame 110 can be made of round tubing, in order to reduce or eliminate sharp corners or edges which are disfavored in hospitals. In an exemplary embodiment, one-inch, 14-gauge tubing can be used, as it provides the necessary strength without the added weight of having the system 100 be made entirely of solid stainless steel round bar. In other embodiments, where weight is not an issue, solid stainless steel round bar can be used.

In order to make the bends in the frame 110, a 304 stainless steel round bar can be used. The bar can be used because it does not easily kink. The ends of the round bar can be worked down until they can be inserted into the tubing—constructing one solid, smooth piece. Later, the seam can be welded so that the frame 110 structure cannot come apart. Additionally, the supporting cross members including lower rear cross beam 225, lower middle cross beam 230, and top cross beam 235, can be welded in place. The welds can be made by TIG welding with pure Argon gas in order to preserve the corrosion resistant properties of stainless steel. This is important, as the frame 110 will be subject to repeated cleaning, and disinfecting chemicals, which may be corrosive to other materials.

The process of making the bends, including right angle 209, top angle 240, bottom angle 241, right angle 214, top angle 245 and bottom angle 246, may require the construction of several bending plates to act as a channel to use as a guide as the shaft is bent to the proper angle. Three plates can be used for every bend-two of them are used to perform the actual bending, and another is used to check the angle of the shaft and make sure the elastic springback does not change the final angle. To perform this task, the two bend plates are secured with two nuts and a screw, leaving about an inch in the middle as a channel to hold the shaft. The shaft can then be welded to one of the plates, heated with a torch, and bent to the shape of the channel.

Thus, in certain embodiments, to satisfy these conditions, stainless steel can be used for all structural components, as it is non-corrosive enough to stand up to the harsh cleaning chemicals used in a hospital, machinable enough to create a frame that satisfied the other criteria, and strong enough to easily hold a patient weighing up to 300 pounds without using large amounts of material which would exceed weight limitations.

The frame 110 further comprises a selection of mounting holes 250. The mounting holes 250 can be configured as through holes through the frame. In certain embodiments, two mounting holes 250 can be formed in the adjacent side 207 of the first triangular shaped stand 205, along with one mounting hole 250 on the opposite side 208. Likewise, two mounting holes 250 can be formed in the adjacent side 212 of the second triangular shaped stand 210, along with one mounting hole 250 on the opposite side 213. There can be two additional mounting holes 250 formed on the lower rear cross beam 225.

Figure 3:
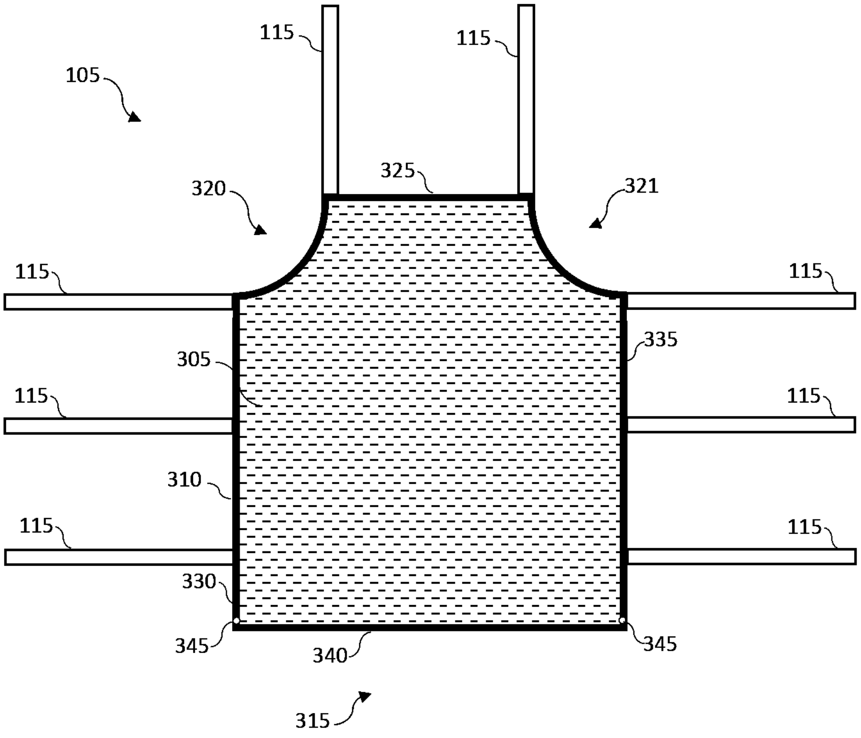
FIG. 3 depicts a mesh support associated with a burn bed system, in accordance with the disclosed embodiments.

FIG. 3 illustrates aspects of the support 105 in accordance with the disclosed embodiments. The support 105 can be connected to a plurality of straps 115. A plurality of mounts 120, which can be embodied in various ways as further detailed herein, are connected to the frame 110. Each of the mounts 120 are configured to operably engage one of the of straps 115.

In certain embodiments, support 105 can comprise a mesh body 305, with a structural border seam 310. The mesh body 305 allows proper airflow to patients' (e.g., burn patients) backs when laying on the support 105. In certain embodiments, the support 105 can comprise a polyester mesh. This mesh body 305 material is preferrable because it promotes the patients' healing and reduces the of risk of infection. For sanitary reasons, the mesh body 305 also can be machine washable. Additionally, the mesh 305 material can be selected to withstand variable tightening. This allows hospital staff to tighten or loosen the mesh body 305 via the structural border seam 310 and associated straps 115 to any desired level of tightness, depending on a patient's weight and the natural wear of mesh.

The support 105 can be configured to have a generally rectangular shape 315. The upper left corner of the support 105 can include a rounded cutout 320, and the upper right corner of the support 105 can include a matching cutout 321. The cutout 320 and the cutout 321 are generally configured to allow the support 105 to extend over the top cross beam 235 when the support is put under tension with the straps 115. In certain embodiments, the cutout 320 and cutout 321 can include a radius of between 6 and 7 inches, although other radial measurements are possible.

In certain embodiments, the plurality of straps 115 can comprise eight total straps 115. Two of the straps 115 can connect to the support 105 along the top side 325. Three straps 115 can be connected to a left side 330, and three straps 115 can be connected to the right side 335. In certain embodiments, no straps are required on the bottom side 340. Grommets 345 can be formed in the structural border seam 310.

Each of the straps 115 can be connected to the structural border seam 310 and/or mesh body 305. The straps 115 are thus operably attached to the support 105 and a plurality of mounts 120 on the frame 110. Each of the plurality of mounts 120 is configured to operably engage one of the plurality of straps 115. It should be understood that in an embodiment, the mesh support 105 further comprises a hospital grade, machine washable mesh.

Figure 4:
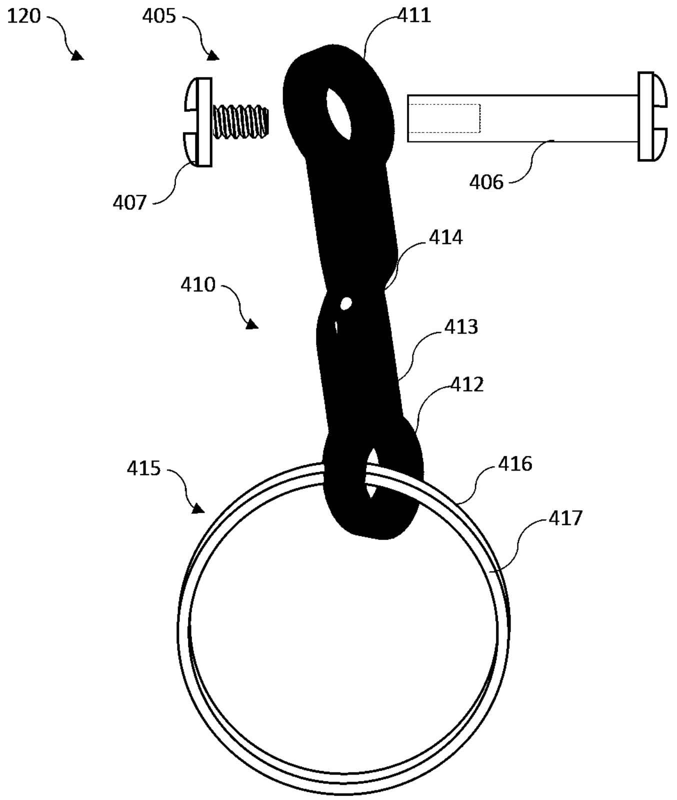
FIG. 4 depicts a mount associated with a burn bed system, in accordance with the disclosed embodiments.
Figure 6A:
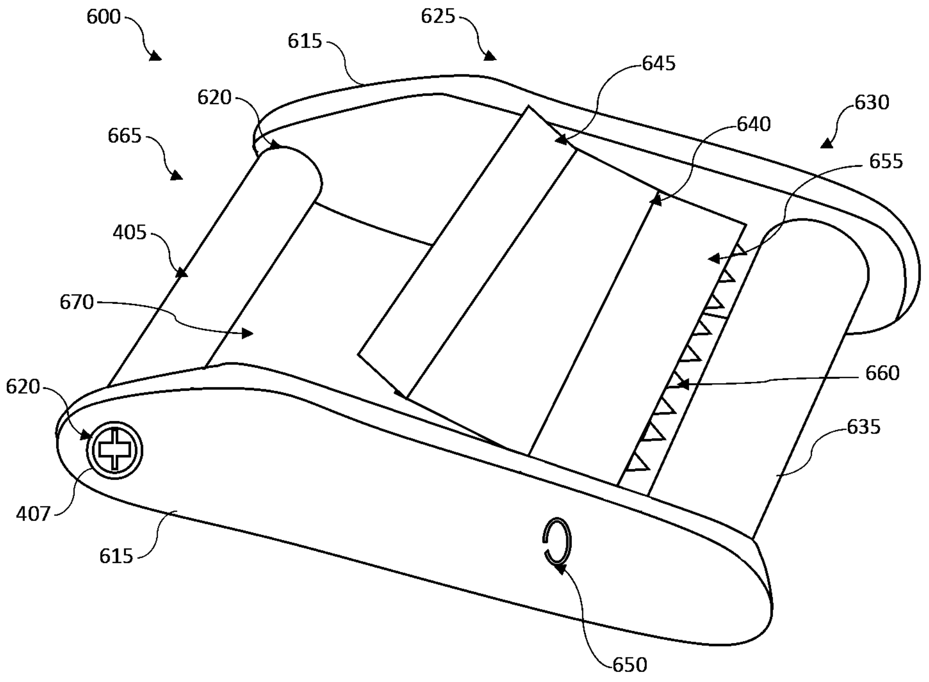
FIG. 6A depicts a toothed cam buckle associated with a burn bed mount, in accordance with the disclosed embodiments.
Figure 6B:
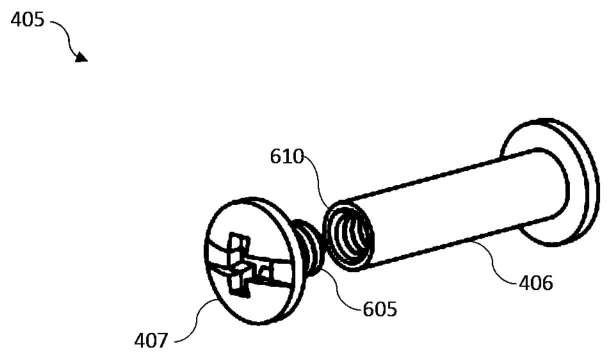
FIG. 6B depicts a barrel screw assembly associated with a burn bed mount, in accordance with the disclosed embodiments.
Figure 6C:
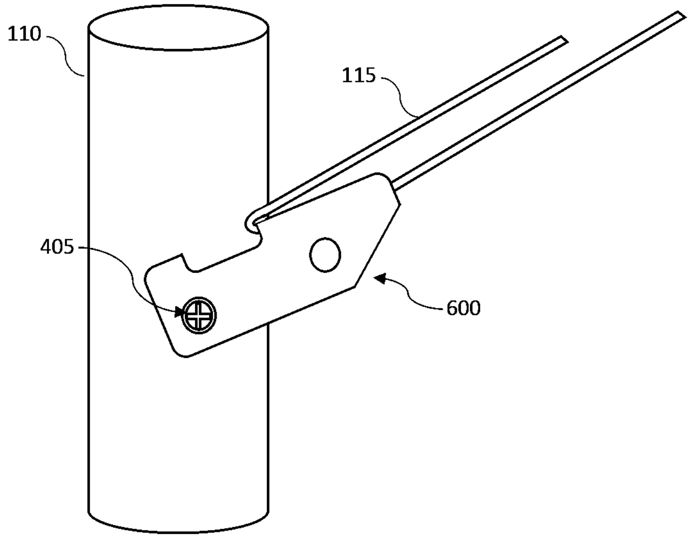
FIG. 6C depicts a toothed cam buckle mounted to a frame of a burn bed, in accordance with the disclosed embodiments.

In certain embodiments, the mounts 120 can include a double ring adjustable strap tensioning system and unique "twisted dog bone" connectors for rotational flexibility from straps 115 to the frame 110 as illustrated in FIG. 4. In other embodiments, the tensioning system can comprise a toothed cam buckle assembly as illustrated in FIG. 6A-6C. The mounts 120 can include a barrel screw assembly 405 including a barrel receiver 406 configured to extend though a mounting hole 150, and a threaded screw 407 configured to engage with the barrel receiver 406.

In an embodiment, the mounts include a twisted dog bone connector 410 comprising a first loop 411 and a second loop 412 attached by a connector body 413. The connector body can comprise a flat piece with a twist 414 such that the face of the first loop 411 is oriented 90 degrees from the face of the second loop 412.

The mounts 120 further include a set of strap rings 415. The set of strap rings include a first ring 416 and a second ring 417 each of which can pass through the second loop 412. The set of strap rings 415 provide a connection point for straps 115. A strap 115 can wrap through the set of rings 415, and then can double back around one of the strap rings 416 and back through the other strap ring 417. This allows the strap to be tensioned through the strap rings 415.

Figure 5A:
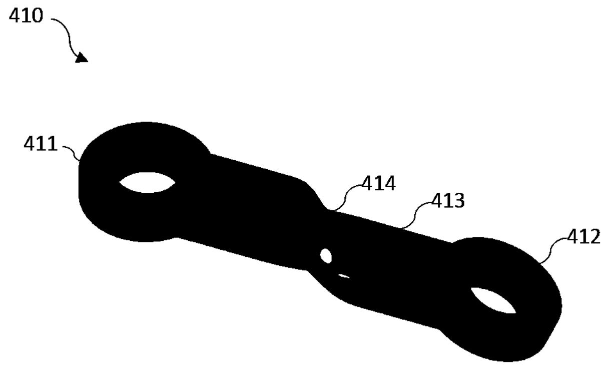
FIG. 5A depicts a twisted dog bone connector associated with a burn bed mount, in accordance with the disclosed embodiments.
Figure 5B:
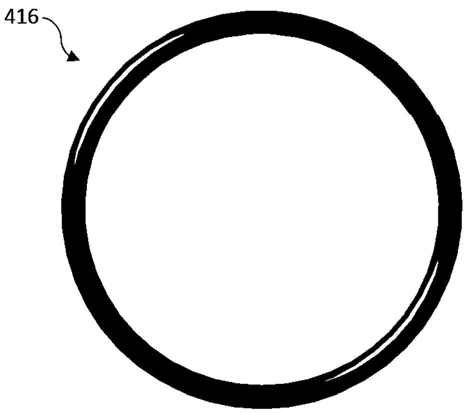
FIG. 5B depicts an O-ring associated with a burn bed mount, in accordance with the disclosed embodiments.

FIG. 5A and FIG. 5B illustrate aspects of the mounts 120. FIG. 5A illustrates the twisted dog bone connector 410. As illustrated, the twisted dog bone connector 410 can comprise a steel body 413, with a twist 414 in the center of the body. one end of the body 413 can have a first metal loop 411 and the other end of the body 413 can have a second metal loop 412. The twist 414 allows the twisted dog bone connector 410 to be engaged to the frame 110, via the barrel screw assembly 405 at one end. The barrel screw assembly 405 can extend through the first loop 411. Once the twisted dog bone connector 410 is connected to the frame 110, the twist 414 allows the second loop 412 to conveniently face so that the straps can be 115 can be engaged to the strap rings 415. In certain embodiments, the twisted dog bone connector 410 can be made out of 3/16" 304 stainless steel plate.

FIG. 5B illustrates on strap ring 416. It should be appreciated that two strap rings 416 and 417 can be engaged through second loop 412 of the twisted dog bone connector 410. The strap rings 415 are configured to allow tensioning of the straps 115.

FIG. 6A-6C illustrate aspects of another mount 120 comprising a toothed cam buckle assembly 600. In certain embodiments, the toothed cam buckle assembly 600, comprises two lateral braces 615 forming a buckle body 625, with mounting holes 620 therein. The operating end 630 of the buckle body 625 has a strap support bar 635 configured proximate to a jaw assembly 640. The frame side 665 can include a gap 670 between lateral braces 615 so that the lateral braces 615 of the toothed cam assembly 600 can be positioned around the frame 110.

The jaw assembly includes 640 includes a jaw lever 645 operably connected to a shaft 650, with a spring (not shown), such that the jaw lever 645 can rotate about the shaft 650. The jaw end 655 of the jaw lever 645 includes a plurality of teeth 660. The spring biases the jaw lever 645 in a position such that the teeth are proximate to the strap support bar 635. In the biased position of the jaw lever 645, the teeth 660 can securely engage a strap between the jaw lever 645 and the strap support bar 635. The jaw lever 645 can be operated, against the bias of the spring, to lift the teeth away from the strap 115, so that the strap 115 can be tensioned.

FIG. 6B illustrates aspects of the barrel screw assembly 405 in accordance with the disclosed embodiments. The barrel receiver 406 is configured to extend though a mounting hole 150, and a threaded screw 407 configured to engage with the barrel receiver 406. The threaded screw 407 can include male threading 605 configured to thread into female threading 610 on the interior of the barrel receiver 406.

FIG. 6C illustrates the use of the toothed cam buckle assembly 600 as a mount 120 for connecting the straps 115 to the frame 110. In operation the holes 620 in the lateral braces 615 can be aligned with mounting holes 250 in the frame 110 and the barrel screw assembly 405 can be inserted there through to connect the toothed cam buckle assembly 600 to the frame 110.

The strap 115 can be threaded through the space between the strap support bar 635 and jaw assembly 640 of the toothed cam buckle assembly 600. The tag end of the strap can be pulled to increase the tension in the strap 115 (and support 105). To loosen the strap 115 the jaw lever 645 can be opened to disengage the strap 115. The strap 115 can then be drawn out of the toothed cam buckle assembly 600 until the desired tension in the strap 115 and support 105 is reached.

It should be appreciated that the mounts 120 detailed herein are exemplary and other mounts can be used in other embodiments. In order to be convenient and efficient for hospital staff, the fasteners that connect the mesh to the frame can be easy to use and easily adjustable. Finally, the device can be configured to have a weight of no more than thirty pounds due to OSHA regulations and so that hospital staff can move it without fear of injuring themselves.

In certain embodiments, the mesh support can include eight straps, each 30 inches in length, although in other embodiments, more or fewer straps of other lengths can be used. The straps are configured to provide the hospital staff maximum flexibility on the desired level of tightness. Grommets 345 can be configured near the bottom of the support 105 and are configured to attach to pegs 260 welded on the sides of the frame 110. This attachment helps keep the mesh in place, and prevents the support 105 from riding up the frame 110 when a person is placed on the mesh for treatment or recovery.

The straps 115 can be threaded in toothed cam buckle assembly 600 that hold the straps 115 at the desired length. In an exemplary embodiment, the mounts 120 can be secured to the frame 110 by barrel screw assembly 405, as opposed to normal nuts and bolts in order to create a near seamless fit and reduce crevices for bacteria.

The result is a system 100 with a frame 110 constructed from 304 stainless steel materials and a hospital grade mesh support 105. The system 100 can weigh less than 30 pounds while being sufficient robust to hold patients in the 95th percentile by weight at the desired angle without any sharp edges present. The mesh support 105 can be easily tightened and is hospital grade.

Figure 7:
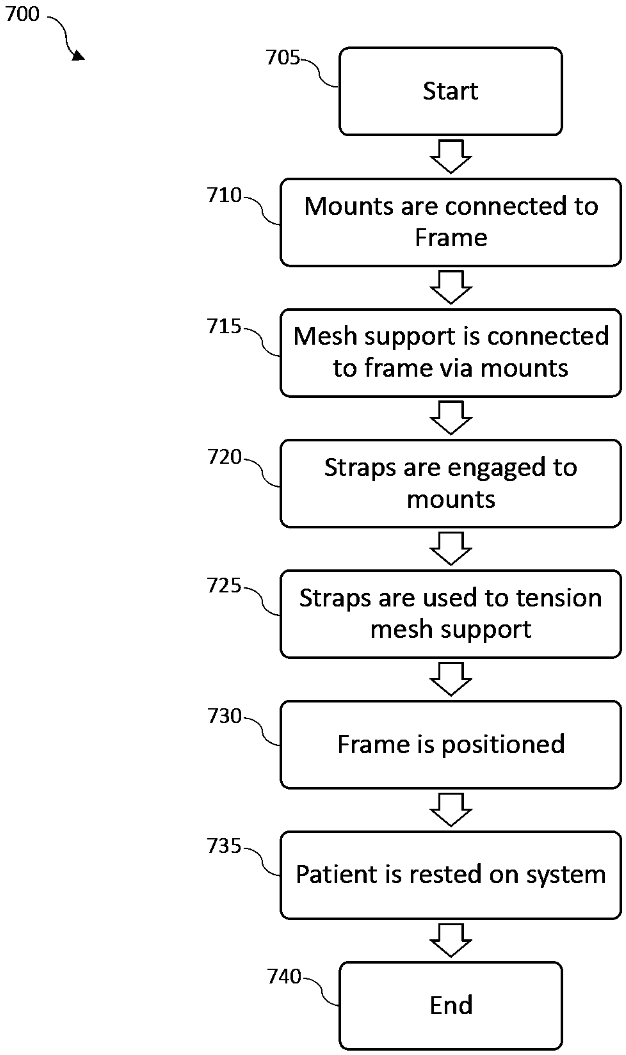
FIG. 7 depicts a method for assembling a burn bed system, in accordance with the disclosed embodiments.

FIG. 7 illustrates a method 700 associated with the configuration and use of a burn bed system 100 as detailed herein, in accordance with the disclosed embodiments. The method 700 beings at step 705.

At step 710, mounts can be connected to the frame using the frame holes in the frame. Next the mesh support can be connected to the frame via the mounts, as illustrated at step 715. The straps can be engaged to the mounts at step 720. In general, this can be accomplished by threading the strap through both of toothed cam buckle assembly.

The strap and mounts can be used to tension the mesh support, at step 725, by adjusting the length of the strap between its connection to the mesh support and the mount. The strap can be pulled further through the toothed cam buckle assembly to reduce the length, or the length can be increased by sliding the tag end of strap back.

Once the desired level of tension is established, at step 730 the frame can be positioned as necessary for the medical application. With the frame in place, the burn bed system is ready for a patient to rest thereon at step 735. The method ends at 740.

Certain advantages of the system include the weight of the system being less than 30 lbs., which allows a single person to move the device. The mesh is made of breathable material, fully capable of adjusting its tension, and shaped to avoid any creasing, reducing possible discomfort for the patient. The structure can be angled at 30 degrees for possible patient intubation. The system does not have any sharp edges, avoiding any risk of damaging the hospital bed or the patient. The system is capable of supporting up to the 95th percentile of patients by weight, making it widely available. The 304 stainless steel used in the structure is corrosion resistant, allowing for the system to be sanitized without worrying about damaging the components. The system does not have any crevices that would allow bacteria to hide and create complications for a patient.

Based on the foregoing, it can be appreciated that a number of embodiments, preferred and alternative, are disclosed herein. For example, a system comprises a frame comprising: a first triangular shaped stand, a second triangular shaped stand and at least one cross beam connecting the first triangular stand and the second triangular stand, and a mesh support extending between the first triangular stand and the second triangular stand.

In an embodiment, the system further comprises at least one riser configured between two sides of the first triangular shaped stand and at least one riser configured between two sides of the second triangular shaped stand. In an embodiment, the first triangular shaped stand, the second triangular shaped stand, and the at least one cross beam are made of stainless steel tubing.

In an embodiment, the frame comprises a lower rear cross beam configured to connect to a right angle of the first triangular shaped stand and a right angle of the second triangular shaped stand, a lower middle cross beam extending between a bottom side of the first triangular shaped stand and a bottom side of the second triangular shaped stand, and a top cross beam configured between a top apex of the first triangular shaped stand and a top apex of the second triangular shaped stand.

In an embodiment, the system further comprises a plurality of straps operably attached to the mesh support and a plurality of mounts on the frame, each of the plurality of mounts configured to operably engage one of the plurality of straps. In an embodiment, the mesh support further comprises a hospital grade, machine washable mesh.

In an embodiment, the system weighs 30 pounds or less. In an embodiment, the frame comprises a wedge and the mesh support is held at a 30 degree angle or less. In an embodiment, the angles in the frame are curved.

In an embodiment, a burn bed comprises a frame comprising a first triangular shaped stand configured as a right triangle, a second triangular shaped stand configured as a right triangle and at least one cross beam there between, a mesh support configured to attach to the frame forming a slanted support surface, and a plurality of straps connecting the support to the frame.

In an embodiment, the burn bed further comprises at least one riser configured between two sides of the first triangular shaped stand and at least one riser configured between two sides of the second triangular shaped stand. In an embodiment, the bottom angle of the first triangular shaped stand is nominally 30 degrees, and the bottom angle of the second triangular shaped stand is nominally 30 degrees.

In an embodiment, the frame comprises a wedge and the mesh support is held at a 30 degree angle or less. In an embodiment, the first triangular shaped stand, the second triangular shaped stand, and the at least one cross beam are made of stainless steel tubing.

In an embodiment, the at least one cross beam further comprises a lower rear cross beam configured to connect to a right angle of the first triangular shaped stand and a right angle of the second triangular shaped stand, a lower middle cross beam extending between a bottom side of the first triangular shaped stand and a bottom side of the second triangular shaped stand, and a top cross beam configured between a top apex of the first triangular shaped stand and a top apex of the second triangular shaped stand.

In an embodiment, the burn bed further comprises a plurality of mounts on the frame, each of the plurality of mounts configured to operably engage one of the plurality of straps. In an embodiment, each of the plurality of mounts further comprise: a barrel screw assembly and a toothed cam buckle assembly. In an embodiment, each of the plurality of mounts are configured to allow a tension of one of the plurality of straps to be adjusted. In an embodiment, the system weighs 30 pounds or less.

In an embodiment, a burn bed apparatus comprises a frame comprising a first triangular shaped stand, a second triangular shaped stand, at least one cross beam connecting the first triangular stand and the second triangular stand, at least one riser configured between two sides of the first triangular shaped stand, and at least one riser configured between two sides of the second triangular shaped stand; a mesh support extending between the first triangular stand and the second triangular stand; a plurality of straps connected to the mesh support; and a plurality of mounts on the frame, each of the plurality of mounts configured to operably engage one of the plurality of straps. In an embodiment, each of the plurality of mounts further comprise: a barrel screw assembly and a toothed cam buckle assembly. In an embodiment, each of the plurality of mounts are configured to allow a tension of one of the plurality of straps to be adjusted It will be appreciated that variations of the above-disclosed and other features and functions, or alternatives thereof, may be desirably combined into many other different systems or applications. Also, it should be appreciated that various presently unforeseen or unanticipated alternatives, modifications, variations, or improvements therein may be subsequently made by those skilled in the art which are also intended to be encompassed by the following claims.

What is claimed is:

1. A system for supporting burn patients comprising:
- a frame comprising:
  - a first triangular shaped stand;
  - a second triangular shaped stand; and
  - at least one cross beam connecting the first triangular shaped stand and the second triangular shaped stand;
  - a first peg on the first triangular shaped stand;
  - a second peg on the second triangular shaped stand;
- a mesh support extending between the first triangular shaped stand and the second triangular shaped stand the mesh support further comprising:
  - a substantially rectangular shape with a first rounded cutout in the upper left corner of the substantially rectangular shape and a second rounded cutout in the upper right corner of the substantially rectangular shape;
  - a structural border seam along the perimeter of the mesh configured to withstand variable tightening;
  - a first grommet in the structural border seam along a bottom edge of the mesh support, the first grommet configured to engage the first peg; and
  - a second grommet in the structural border seam along the bottom edge of the mesh support, the second grommet configured to engage the second peg;
- a plurality of straps operably attached to the structural border seam of the mesh support; and
- a plurality of mounts configured to connect the plurality of straps to the frame and provide adjustable tension through each of the plurality of straps.

2. The system for supporting burn patients of claim 1 further comprising:
- at least one riser configured between two sides of the first triangular shaped stand; and
- at least one riser configured between two sides of the second triangular shaped stand.

3. The system for supporting burn patients of claim 2 wherein the first triangular shaped stand, the second triangular shaped stand, and the at least one cross beam are made of stainless steel tubing.

4. The system for supporting burn patients of claim 3 wherein the frame comprises:
- a lower rear cross beam configured to connect to a right angle of the first triangular shaped stand and a right angle of the second triangular shaped stand;
- a lower middle cross beam extending between a bottom side of the first triangular shaped stand and a bottom side of the second triangular shaped stand; and
- a top cross beam configured between a top apex of the first triangular shaped stand and a top apex of the second triangular shaped stand.

5. The system for supporting burn patients of claim 4 wherein each of the plurality of mounts comprise:

a twisted dog bone connector comprising a first loop and a second loop connected by a flat piece, the flat piece having a twist such that a face of the first loop is oriented 90 degrees from a face of the second loop;

a first strap ring installed through the first loop;

a second strap ring installed through the first loop; and a barrel screw assembly configured to pass through the second loop and through a hole in the frame, wherein the barrel screw assembly is configured to engage the mount to the frame.

6. The system for supporting burn patients of claim 5 wherein the mesh support further comprises:

a polyester, machine washable mesh configured to allow air to flow through the mesh support.

7. The system for supporting burn patients of claim 6 wherein the system weighs 30 pounds or less; and the mesh support is fixed in place at an angle of 30 degrees or less.

8. The system for supporting burn patients of claim 7 wherein the plurality of straps comprise eight total straps comprising:

a first strap attached to the mesh support at a top of the first rounded cutout in the upper left corner;

a second strap attached to the mesh support at a top of the second rounded cutout in the upper right corner;

a third strap attached to the mesh support at a bottom of the first rounded cutout in the upper left corner;

a fourth strap attached to the mesh support at a bottom of the second rounded cutout in the upper right corner;

a fifth strap attached to a side of the mesh support below the bottom of the first rounded cutout in the upper left corner;

a sixth strap attached to a side of the mesh support below the bottom of the first rounded cutout in the upper left corner;

a seventh strap attached to a side of the mesh support below the bottom of the second rounded cutout in the upper right corner;

an eighth strap attached to a side of the mesh support below the bottom of the second rounded cutout in the upper right corner.

9. The system for supporting burn patients of claim 8 wherein angles in the frame are curved.

* * * * *